United States Patent [19]

Javidi

[11] Patent Number: 5,111,515
[45] Date of Patent: May 5, 1992

[54] IMAGE DECONVOLUTION BY A LOGARITHMIC EXPONENTIAL NONLINEAR JOINT TRANSFORM PROCESS

[75] Inventor: Bahram Javidi, West Willington, Conn.

[73] Assignee: The United States of America as represented by the Secretary of the Air Force, Washington, D.C.

[21] Appl. No.: 546,480

[22] Filed: Jun. 29, 1990

[51] Int. Cl.$^5$ .................................. G06F 15/332
[52] U.S. Cl. .................................. 382/43; 382/31; 382/54; 359/559
[58] Field of Search .................... 382/31, 43, 54; 350/162.12, 162.14; 364/724.11

[56] References Cited

U.S. PATENT DOCUMENTS

| | | | |
|---|---|---|---|
| 4,074,231 | 2/1978 | Yojima et al. | 382/50 |
| 4,357,676 | 11/1982 | Brown | 364/822 |
| 4,573,198 | 2/1986 | Anderson | 382/31 |
| 4,633,504 | 12/1986 | Wihl | 382/54 |
| 4,695,973 | 9/1987 | Yu | 364/822 |
| 4,783,836 | 11/1988 | Takashima | 382/54 |
| 4,832,447 | 5/1989 | Javidi | 364/822 |
| 4,947,323 | 8/1990 | Smith | 382/8 |

OTHER PUBLICATIONS

Javidi, Bahram, "Image deconvolution by a logarithmic/exponential nonlinear joint transform process", Applied Optics, Feb. 10, 1990, vol. 29, No. 5, pp. 685–690.
Javidi, Bahram et al., "Image deconvolution by nonlinear signal processing", Appl. Optics, vol. 28, No. 15, Aug. 1, 1989, pp. 3106–3111.

Primary Examiner—Leo H. Boudreau
Assistant Examiner—Barry Stellrecht
Attorney, Agent, or Firm—Robert L. Nathans; Donald J. Singer

[57] ABSTRACT

A logarithmic/exponential nonlinear joint transform processor performs image deconvolution and is used to restore smeared or out of the focus degraded images. The correct Fourier phase of the original signal is restored in the joint power spectrum of the smeared image and the smearing function. The correct Fourier amplitude of the original signal is restored by essentially dividing out the Fourier amplitude of the smearing function from the joint power spectrum. The division is achieved by subtracting the $\log_e$ of the power spectrum of the smearing function from the $\log_e$ of the joint power spectrum followed by an exponential nonlinearity.

5 Claims, 1 Drawing Sheet

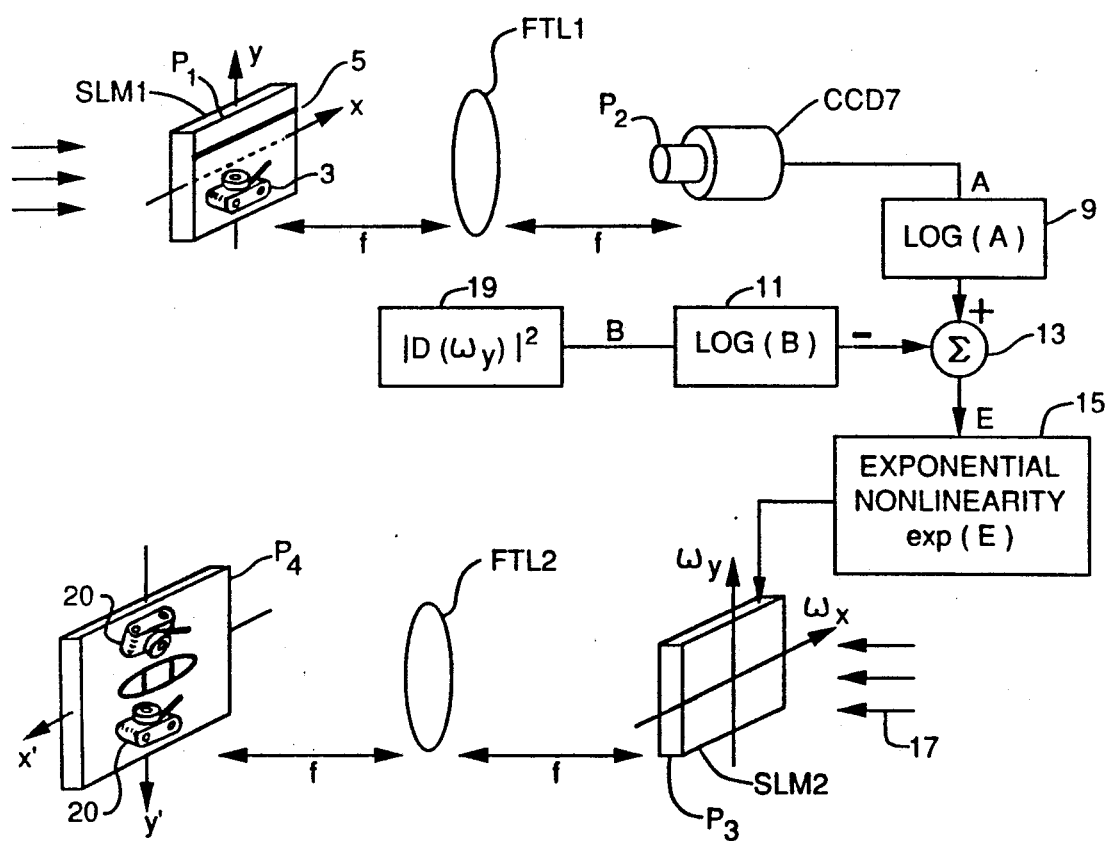

IMAGE DECONVOLUTION BY A LOGARITHMIC EXPONENTIAL NONLINEAR JOINT TRANSFORM PROCESS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of image restorage of smeared photographic images.

Restoration of smeared photographic images has used optical spatial filtering to reduce smearing effects present in the input image. In such techniques, a spatial filter with a transfer function proportional to the inverse of the Fourier transform of the blur function is employed to restore the original image.

In a recent paper "Deconvolution Using a Joint Transform Correlator"; B. Javidi et al.; Opt. Commun. 70, 369-372, (1989), a binary nonlinear joint transform correlator is described that can perform image deconvolution in real time. In this technique, both the degraded image and the blur function are displayed side by side at the input plane of the joint transform optical correlator. The joint power spectrum (JPS) is obtained using a Fourier transform lens and a square law device such as a CCD array image sensor. The exact Fourier phase of the original image is recovered in the joint power spectrum from the multiplication of the Fourier transform of the smeared image by the conjugate of the Fourier transform of the smearing function.

A hard clipping nonlinearity is used to threshold the joint power spectrum to only two values 1 and −1. The effect of the nonlinearity is to remove the distorted amplitude entirely while retaining the correct phase of the original signal. An amplitude mask averaged over an ensemble of images can be used at the Fourier plane to provide an estimate for the Fourier amplitude component. An inverse Fourier transform of the averaged amplitude and the recovered correct Fourier phase information then yields the original image with reduced distortion.

BRIEF SUMMARY OF A PREFERRED EMBODIMENT OF THE INVENTION

It is an object of the present invention to eliminate the use of the averaged amplitude mask of the aforesaid technique to approximate the amplitude information.

It is a further object of the present invention to restore the joint power spectrum without generating the higher harmonic terms produced by the aforesaid technique, and thus eliminating noise at the output plane.

In the preferred embodiment of the invention, the smeared image and the blur function are Fourier transformed to produce the joint power spectrum (JPS) and the exact Fourier phase information is retained therein. Restoration of the Fourier amplitude begins by applying a logarithmic nonlinearity to both the joint power spectrum of the smeared image and the blur function, and the power spectrum of the blur function. The amplitude distortion of the JPS is then removed by subtracting the log of the power spectrum of the blur function from the log of the joint power spectrum. As exponential nonlinearity is then applied to the logarithmic subtraction difference signal to implement an inverse logarithmic operation and to recover the Fourier amplitude and the Fourier phase of the original image. An inverse Fourier transform of the resulting modified joint power spectrum yields the unsmeared image at the output plane of the processor.

BRIEF DESCRIPTION OF THE DRAWINGS

Other objects, features and advantages of the present invention will become apparent upon study of the following description, taken in conjunction with the sole Figure which discloses a preferred embodiment of the invention.

DETAILED DESCRIPTION OF A PREFERRED EMBODIMENT OF THE INVENTION

We assume an original image s(x,y) is smeared by the function d(x,y) according to the following equation:

$$g(x,y) = s(x,y) * d(x,y) \quad (1)$$

where g(x,y) is the distorted image, and * denotes the convolution operation. The Fourier transform of the smeared image may be written as:

$$G(\omega_x,\omega_y) = S(\omega_x,\omega_y) D(\omega_x,\omega_y), \quad (2)$$

where $(\omega_x,\omega_y)$ are the frequency coordinates, and G(.), S(.), and D(.) are the Fourier transforms of g(.), s(.) and d(.) respectively. The complex Fourier transform of each signal is represented by:

$$E(\omega_x,\omega_y) = A_e(\omega_x,\omega_y) \exp[j\phi_e(\omega_x,\omega_y)] \quad (3)$$

where $A_e(\omega_x,\omega_y)$ and $\phi_e(\omega_x,\omega_y)$ correspond to the amplitude and phase of the Fourier transforms of $E(\omega_x,\omega_y)$, respectively. Thus the Fourier transform of the distorted image may be written as:

$$G(\omega_x,\omega_y) = A_g(\omega_x,\omega_y)\exp[j\phi_g(\omega_x,\omega_y)] = A_s(\omega_x,\omega_y)A_d(\omega_x,\omega_y) \times \exp[j\phi_s(\omega_x,\omega_y)+\phi_d(\omega_x,\omega_y)] \quad (4)$$

where $$A_g(\omega_x,\omega_y) = A_s(\omega_x,\omega_y)A_d(\omega_x,\omega_y). \quad (5)$$

$$\phi_g(\omega_x,\omega_y) = \phi_s(\omega_x,\omega_y) + \phi_d(\omega_x,\omega_y). \quad (6)$$

The proposed architecture to perform the real time deconvolution using an electrically addressed SLM is shown in FIG. 1. Plane P1 is the input plane where the degraded image function 3; g(x,y) is displayed on the bottom. The blur function 5; d(x) is displayed on the top of the input plane P1 containing SLM1:

$$f(x,y) = g(x,y+y_0) + d(y-y_0), \quad (7)$$

where f(x,y) is the transmission function at the input plane, $y_0$ is the separation of the input images from the optical axis, and we have assumed a 1-D blur function.

The interference between the Fourier transforms of the input signals 3 and 5 is obtained at plane P2 using the Fourier transform lens FTL1; i.e., $$F(\omega_x,\omega_y) = G(\omega_x,\omega_y)\exp[+j\omega_y y_0] + D(\omega_y)\exp[-j\omega_y y_0]. \quad (8)$$

The CCD array 7 located at plane P2 is used to obtain the intensity of the Fourier transform interference given by:

$$I(\omega_x,\omega_y) = |F(\omega_x,\omega_y)|^2 = |D(\omega_y)|^2 + |G(\omega_x,\omega_y)|^2 + D^*(\omega_y)G(\omega_x,\omega_y) \times exp[+j2y_0\omega_y] + G^*(\omega_x,\omega_y)D(\omega_y) exp[-j2y_0\omega_y]. \quad (9)$$

where * denotes the complex conjugation. The product of the Fourier transform of the smeared image with the complex conjugate Fourier transform of the smearing function results in an exact phase recovery of the original image. This is made evident by rewriting the Fourier transform terms of Eq.(9), using Eq. (3) and applying Eqs. (4), (5) and (6):

$$I(\omega_x,\omega_y) = A_s(\omega_y)A_d^2(\omega_x,\omega_y) \exp[j\phi_s(\omega_x,\omega_y)] \exp[+j2y_0\omega_y] + \quad (10)$$
$$A_d^2(\omega_y)A_s(\omega_x,\omega_y) \exp[-j\phi_s(\omega_x,\omega_y)] \exp[-j2y_0\omega_y] +$$
$$|A_s(\omega_x,\omega_y)A_d(\omega_y)|^2 + |A_d(\omega_y)|^2.$$

Finally by grouping the exponential phase shift terms, the JPS can be written as:

$$I(\omega_x,\omega_y) = 2A_s(\omega_x,\omega_y)A_d^2(\omega_y)\cos[2y_0\omega_y + \phi_s(\omega_x,\omega_y)] + |A_g(\omega_x,\omega_y)|^2 + |A_d(\omega_y)|^2. \quad (11)$$

Thus, the correct Fourier phase information of the original image signal 3 is is obtained in the JPS. Equation (11) describes an amplitude and phase modulated waveform. The Fourier phase of the original signal is retained by phase modulation and the smeared Fourier amplitude is retained by amplitude modulation. Thus, if the degraded amplitude is removed, the remaining waveform will contain the correct amplitude and phase information of the original image modulated by a carrier term.

The amplitude degradation caused by the smearing effect is removed by a logarithmic nonlinearity followed by an exponential nonlinearity. A division operation of A/B is implemented by using the following rule:

$$A/B = exp[log_e A - log_e B]. \quad (12)$$

Here A is the JPS of the input images indicated by Eq. (11) and B is the square of the Fourier amplitude spectrum of the smearing function, Namely $A_d^2(\omega_y)$; which is the power spectrum of the smearing function. The subtraction of the two log functions yields:

$$\log_e(A + \epsilon) - \log_e(B + \epsilon) = \log_e[(A + \epsilon)/(B + \epsilon)] \quad (13)$$
$$= \log_e\left\{ \frac{|A_d(\omega_y)|^2 + |A_g(\omega_x,\omega_y)|^2 + 2A_s(\omega_x,\omega_y)A_d^2(\omega_y)\cos[2\omega_y y_0 + \phi_s(\omega_x,\omega_y)] + \epsilon}{|A_d(\omega_y)|^2 + \epsilon} \right\}$$
$$\approx \log_e(A/B).$$

A small constant $\epsilon$ is added to avoid the zero crossings of both the numerator and the denominator; $\epsilon = 10^{-40}$ will eliminate the zero crossing problem that is inherent while working with logarithmic functions and a successful division will thus be obtained.

The subtraction results in:

$$\log_e(A + \epsilon) - \log_e(B + \epsilon) = \log_e[(A + \epsilon)/(B + \epsilon)] \quad (14)$$
$$\approx \log_e\left\{ \frac{|A_d(\omega_y)|^2 + |A_g(\omega_x,\omega_y)|^2 + \epsilon}{|A_d(\omega_y)|^2 + \epsilon} + 2A_s(\omega_x,\omega_y)\cos[2\omega_y y_0 + \phi_s(\omega_x,\omega_y)] \right\},$$

where we have assumed a successful division to recover the Fourier magnitude of the original image. It is evident from Eq. (14) that both the Fourier amplitude and phase of the original image are recovered in the argument of the log function. An inverse logarithmic function such as an exponential nonlinearity will eliminate the effect of the log nonlinearity and will produce the unsmeared JPS:

$$C(\omega_x,\omega_y) = \exp[\log_e(A + \epsilon) - \log_e(B + \epsilon)] \quad (15)$$
$$\approx \frac{|A_d(\omega_y)|^2 + |A_g(\omega_x,\omega_y)|^2 + \epsilon}{|A_d(\omega_y)|^2 + \epsilon} +$$
$$2A_s(\omega_x,\omega_y)\cos[2\omega_x y_0 + \phi_s(\omega_x,\omega_y)].$$

An inverse Fourier transform of Eq. (15) will produce the original image shifted to $-2y_0$ and an inverted original image shifted to $+2y_0$; and the inverse Fourier transform of the DC terms at the output plane:

$$R(x',y') = s_r(x',y' + 2y_0) + s_r(-x',-y' + 2y_0) + h(x',y'), \quad (16)$$

where $s_r(.)$ is the restored image, and $h(x',y')$ is the inverse Fourier transform of the first term of Eq. (15) (dc terms).

The aforesaid log (A) and log (B) operations are schematically illustrated in FIG. 1 at 9 and 11, the outputs thereof being applied to subtraction means 13, which applies a difference signal to exp(E) processor 15 which in turn inputs SLM2 in plane P3. Lens FTL2 then inverse Fourier transforms the signal displayed on SLM2 to produce the aforesaid unsmeared images 20 in plane P4. The operations carried out by 9,11, 13 and 15 may be implemented by hardware or software in a manner obvious to the skilled programmer. The blur function second Fourier transform means 19, could comprise a third Fourier transform lens, viewing the blur function per se.

Thus, to summarize, we divide the joint power spectrum of the optical interference pattern by the power spectrum of the smearing function to produce a modified power spectrum having the Fourier amplitude and phase of the original input signal and we then Fourier transform the modified joint power spectrum to recover the unsmeared image. This is readily apparent to those skilled in the art in the light of the universally well known rule of logarithms: A/B = exp(logA-logB); see equation (12).

It is possible to also implement the processor using an optically addressed SLM. In this case, an optically addressed SLM is used at the Fourier plane to obtain the JPS between the blur function and the blurred image. An SLM with logarithmic characteristics can perform a logarithmic transformation on the JPS simultaneously. Similarly, the log of the power spectrum of the blur function is obtained and is optically subtracted from the log of the JPS. An exponential nonlinearity is applied to the difference to produce the output signal.

Experiments with joint transform correlators indicate that the dynamic range of the CCD at the Fourier plane should be sufficiently large to obtain a good correlation performance. In general, a quantization level of more than 1000 is desired to produce good correlation signals. The dynamic range requirements for nonlinear processors depend upon the type of nonlinearity used at the Fourier plane and the type of the processing operation. For a further discussion of our experimental results of the aforesaid processor of the present invention, see Applied Optics; Vol. 29, No. 5; Feb. 10, 1990 authored by B. Javidi.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. Method of recovering a substantially unsmeared image of a smeared image by performing joint transformation processing of a smeared image and its smearing function comprising the steps of:
    (a) producing an interference pattern between Fourier transforms of said smeared image and an image of said smearing function;
    (b) obtaining a joint power spectrum of said interference pattern;
    (c) generating the logarithm of said joint power spectrum;
    (d) generating the logarithm of the power spectrum of said smearing function;
    (e) producing a difference signal by subtracting the log of the power spectrum of said smearing function from the log of said joint power spectrum;
    (f) applying an inverse logarithmic function to said difference signal to produce an unsmeared joint power spectrum; and
    (g) Fourier transforming said unsmeared joint power spectrum to recover an unsmeared image of said smeared image.

2. Method of recovering a substantially unsmeared image of a smeared optical image by performing joint transform processing of a smeared optical image and its optical smearing function comprising the steps of:
    (a) displaying said smeared optical image side-by-side with said optical smearing function;
    (b) producing an optical interference pattern between a Fourier transform of the smeared optical image and a Fourier transform of an optical image of said smearing function;
    (c) obtaining a joint power spectrum of said optical interference pattern;
    (d) generating the logarithm of said joint power spectrum;
    (e) generating the logarithm of the power spectrum of said smearing function;
    (f) producing a difference signal by subtracting the log of the power spectrum of said smearing function from the log of said joint power spectrum;
    (g) applying an inverse logarithmic function to said difference signal to produce an unsmeared joint power spectrum; and
    (h) Fourier transforming said unsmeared joint power spectrum to recover an unsmeared image of said smeared image.

3. Method of recovering a substantially unsmeared image of a smeared optical image by performing joint transform processing of a smeared optical image and an optical image of its smearing function comprising the steps of:
    (a) producing an optical interference pattern between a Fourier transform of the smeared optical image and a Fourier transform of the optical image of said smearing function;
    (b) obtaining a joint power spectrum of said optical interference pattern;
    (c) providing a power spectrum of said smearing function;
    (d) dividing the joint power spectrum of said optical interference pattern by the power spectrum of the smearing function to produce a modified joint power spectrum having the Fourier amplitude and phase of the original input signal; and
    (g) Fourier transforming said modified joint power spectrum to recover an unsmeared image of said smeared optical image.

4. Apparatus for recovering a substantially unsmeared image of a smeared input image by performing joint transform processing of a smeared image and its smearing function comprising:
    (a) means for producing an optical interference pattern between a Fourier transform of the smeared image and a Fourier transform of an optical image of said smearing function;
    (b) means for obtaining a joint power spectrum of said optical interference pattern;
    (c) means for producing the power spectrum of said smearing function;
    (d) means for dividing the joint power spectrum of said interference pattern by the power spectrum of the smearing function to produce a modified joint power spectrum having the Fourier amplitude and phase of the original input signal; and
    (g) means for Fourier transforming said modified joint power spectrum to recover an unsmeared image of said smeared input image.

5. Apparatus of claim 4 including a spatial light modulator for displaying said smeared image alongside an optical image of said smearing function and wherein said means for producing said optical interference pattern comprises a Fourier transform lens co-acting with said spatial light modulator.

* * * * *